Oct. 20, 1936.    R. C. NEWHOUSE    2,057,841
METHOD OF STRESS RELIEVING WELDED JOINTS
Original Filed May 23, 1932
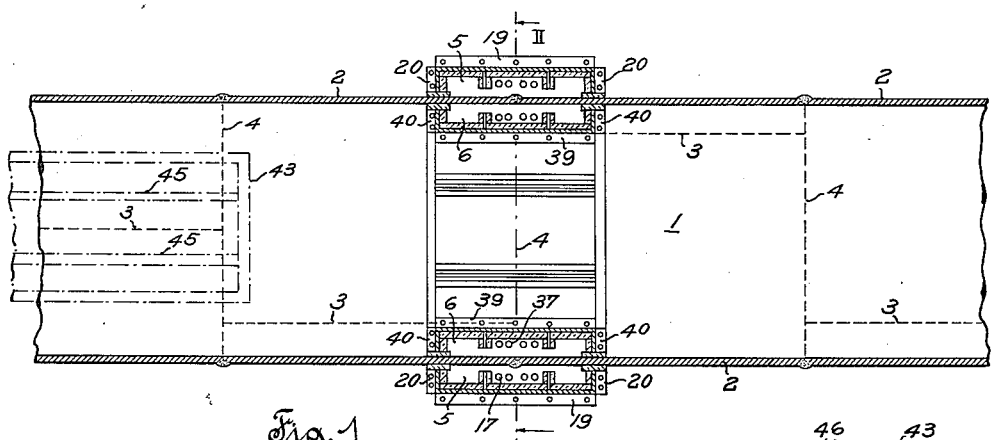
Fig. 1
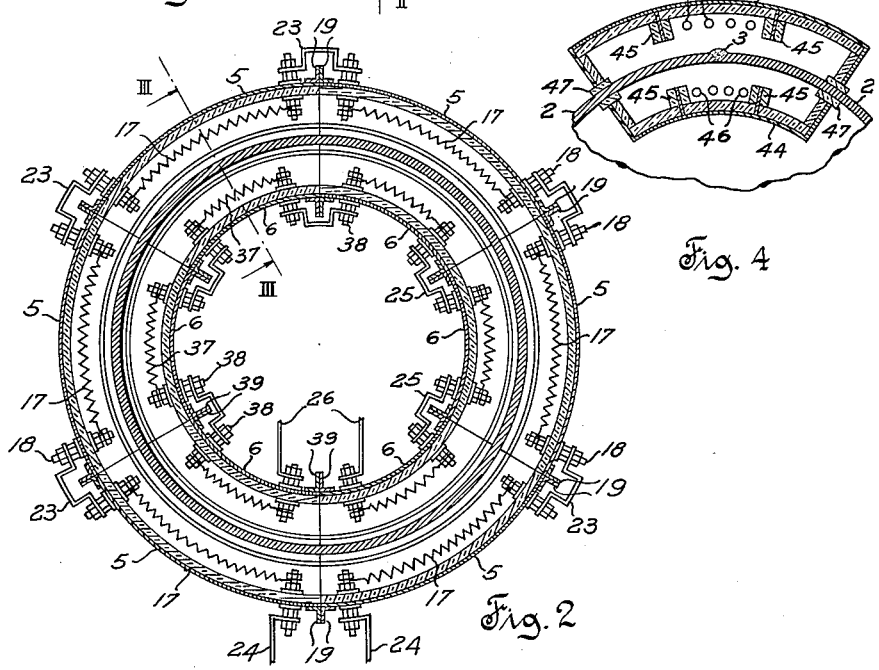
Fig. 4
Fig. 2
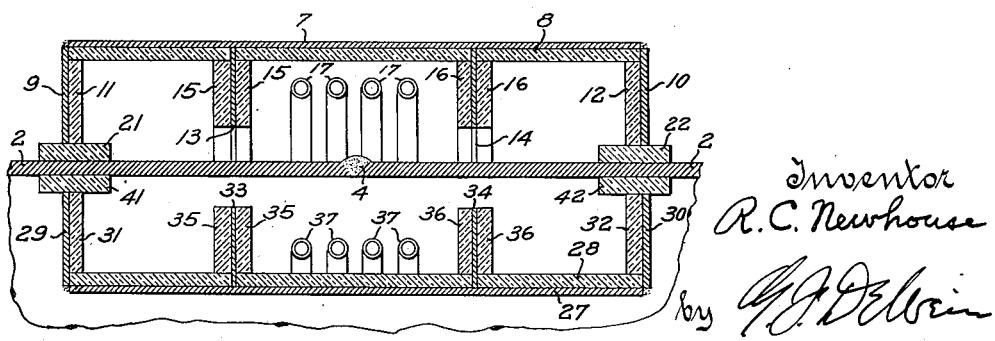
Fig. 3
Inventor
R. C. Newhouse
by G. J. Elbin
Attorney Patented Oct. 20, 1936

2,057,841

UNITED STATES PATENT OFFICE 2,057,841

METHOD OF STRESS RELIEVING WELDED JOINTS

Ray C. Newhouse, Wauwatosa, Wis., assignor to Allis-Chalmers Manufacturing Company, Milwaukee, Wis., a corporation of Delaware Original application May 23, 1932, Serial No. 613,018. Divided and this application January 5, 1935, Serial No. 498

6 Claims. (Cl. 148—13)

This invention relates generally to the art of heat treating articles and it relates more specifically to an improved method of stress relieving welded joints, an apparatus for carrying out the method being claimed in U. S. Patent 2,044,734, June 16, 1936, Ray C. Newhouse, Apparatus for stress relieving welded joints, the present application being a division of the application which has resulted in the grant of said patent.

It is an object of the invention to provide an efficient and inexpensive method of stress relieving welded joints on metal structures of large dimensions.

Another object of the invention is to provide a method of stress relieving welded joints on metal structures of large dimensions, which method may be carried out without the employment of a furnace of large capacity such as to receive and heat the entire metal structure.

Another object of the invention is to provide a method of stress relieving welded joints on metal structures of large dimensions, which method may readily be carried out at the place where the metal structure is to be erected or assembled, that is, outside of its place of manufacture.

A more specific object of the invention is to provide an efficient and inexpensive method of stress relieving welded joints on plate metal vessels and other plate metal structures of large dimensions, such as cylindrical shells for grinding mills, kilns, and other machines, boilers, penstocks and the like.

These and other objects and advantages of the invention will be apparent from the following description. A clear conception of a preferred manner in which the method according to the invention may be carried out, may be had by referring to the drawing accompanying and forming a part of this specification, in which like reference characters designate the same or similar parts in the several views.

Fig. 1 is a vertical longitudinal section through a cylindrical shell of a rotary kiln or the like, with an apparatus for stress relieving a circumferential joint applied thereto.

Fig. 2 is an enlarged section on line II—II of Fig. 1.

Fig. 3 is an enlarged section on line III—III of Fig. 2.

Fig. 4 is a vertical transverse section through a furnace of modified construction for stress relieving longitudinal joints.

The numeral 1 indicates generally the cylindrical shell of a rotary kiln or like structure which is made in sections, each section consisting of a steel plate 2 rolled into cylindrical shape and having its ends connected together by a longitudinal welded joint 3. Adjoining sections of the cylindrical shell are connected together by welded circumferential joints 4. A portion of the shell 1, where a circumferential joint occurs, is surrounded exteriorly by a ring shaped casing comprising six sections 5; and another ring shaped casing comprising six sections 6 is placed, concentric with the outer casing, interiorly of the shell so as to cover the welded joint and the adjacent portions of the cylindrical shell sections between which the welded joint occurs.

Each section 5 of the outer casing has a curved top wall and side walls spaced in the direction of the axis of the shell and extending in planes at right angles thereto. The top wall is formed of a sheet metal facing 7 and a lining 8 of heat insulating material, such as asbestos. The side walls are constructed similarly of sheet metal facings 9 and 10 and linings 11 and 12 of heat insulating material. The sheet metal facings of the top and side walls are secured together, as by welding, and they form a frame, so to speak, for supporting the heat insulating material which is secured thereto. Sheet metal members 13 and 14 somewhat similar to the sheet metal facings 9 and 10 of the side walls are secured to the inner surface of the sheet metal facing 7, for instance by welding, and linings 15 and 16 of heat insulating material are secured thereto in any suitable manner. The sheet metal members 13 and 14 and the heat insulating linings 15 and 16 secured thereto do not extend down to the surface of the cylindrical shell. They are intended to serve as baffles dividing the interior space of each ring section 5 into a central zone adjacent to the welded joint and lateral zones in communication with the central zone. Arranged in the central zone and supported by the top wall of the casing section 5 are four heating elements in the form of electric resistance coils 17 from which heat is transmitted to the welded joint by radiation. The ends of the coils 17 are clamped to terminal studs 18 carried by the ring sections 5, the terminal studs projecting through the top wall of the ring section in order to facilitate the making of electrical connections.

Secured to the sheet metal facing 7 of each ring section 5 are flanges 19, one at each end of the section, which flanges permit adjacent ring sections to be rigidly secured together. Similar flanges 20 are secured to the sheet metal facings 9 and 10 of the side walls. The flanges are suitably drilled for receiving through bolts which may hold the sections securely together. When all six ring sections of the outer casing are securely clamped together by means of their flanges 19 and 20, a rigid ring shaped structure of a given inside diameter is obtained, said inside diameter being determined by the distance between diametrically opposed points on the inner edge of the ring formed by the circularly arranged side walls 9 or 10 of the casing sections 5. This inside diameter of the outer casing is preferably somewhat larger than the outside diameter of the cylindrical shell to which the casing is to be applied, and spacers 21 and 22 of heat insulating material are provided to fill the the gaps between the outer surface of the cylindrical shell and the side walls of the casing sections 5. By means of the spacers an outer ring shaped casing of fixed inside diameter may be accommodated to cylindrical shells of different diameters as the thickness of the spacers may vary to a considerable extent. Thus, for instance, if the outside diameter of the shell is only slightly less than the inside diameter of the casing, spacers of less thickness than that shown in the drawing may be used, and if the outside diameter of the shell and the inside diameter of the casing differ considerably, correspondingly thicker spacers may be used. The spacers are valuable also in that they prevent contact between the shell and the metal facing of the casing sections which contact may tend to produce an undesirable dissipation of heat from the shell. When the outer casing sections are assembled as shown in Fig. 2, the terminal studs 18 of the heating coils 17 may be connected by straps 23 in any desired combination. 24 indicates the connections of the heating coils 17 with a source of electrical energy not shown.

The inner casing which consists of the six sections 6 is constructed in a similar manner as the outer casing. Each section 6 has a curved bottom wall and side walls, the bottom wall comprising a sheet metal facing 27 and a lining 28 of heat insulating material, and the side walls comprising sheet metal facings 29 and 30, and linings 31 and 32. Baffles, corresponding to the baffles of the outer casing sections, are formed by sheet metal members 33 and 34 and linings 35 and 36. Arranged in the central zone of each inner casing section 6 and supported by the bottom wall thereof are four heating elements in the form of electric resistance coils 37 from which heat is transmitted to the welded joint by radiation. The ends of the coils are clamped to terminal studs 38 projecting through the bottom wall of the inner casing section 6 in order to facilitate the making of electrical connections.

The inner casing sections 6 are clamped together by means of flanges 39 and 40 and through bolts in a similar manner as the outer casing sections 5, and when assembled form a rigid structure of a given outside diameter, the latter being determined by the distance between diametrically opposed points on the outer edge of the ring formed by the circularly arranged side walls 29 or 30 of the casing sections 6. This outside diameter of the inner casing is preferably somewhat smaller than the inside diameter of the cylindrical shell to which the casing is to be applied, and spacers 41 and 42 of heat insulating material are provided to fill the gaps between the inner surface of the cylindrical shell and the side walls of the casing sections 6. By using spacers of different thickness an inner ring shaped casing of given outside diameter may be accommodated to cylindrical shells of different diameters as explained in connection with the outer casing. 25 and 26 indicate straps and electrical connections similar to the straps 23 and electrical connections 24 mentioned in connection with the outer casing.

A circumferential welded joint of the cylindrical shell 1 may be stress relieved by means of the apparatus described hereinbefore, as follows. The inner and outer ring shaped casings are applied to the shell as shown in the drawing, that is, the outer ring shaped casing is brought into such position that the central zone with the heating elements is directly above the joint, and similarly, the inner casing is brought into such position that the open side of the central zone with the heating elements faces the joint. In these positions the casings form, as will be seen, heat retaining hoods over the welded joint and the adjacent portions of the cylindrical shell sections which are circumferentially connected by the joint. For purposes of description it may be assumed that the heating coils of the individual casing sections are connected as shown in Fig. 2, that is, that the heating coils 17 of the outer casing sections 5 are connected in series by the straps 23 so as to form a circuit terminating in the connections 24, and that the heating coils 37 of the inner casing sections 6 are likewise connected in series by the straps 25 so as to form a circuit terminating in the connections 26. The connections 24 and 26 lead, as stated, to a suitable source of electric energy, and it should be understood that such energy will be caused to flow simultaneously through the two circuits formed by the heating coils 17 and 37. As a result, heat will be generated at the joint interiorly and exteriorly of the shell and substantially throughout the length of the joint, circumferentially of the shell, as long as there is a flow of electric energy through the two circuits.

Upon connecting the two circuits to the source of energy the portions of the shell covered by the inner and outer casings will be caused to warm up, and due to the substantially uniform distribution of the heat longitudinally of the joint, there will be a substantially uniform rise of temperature in the shell longitudinally of the joint and throughout the length of the latter. Sufficient energy will be supplied by the source to the two circuits to develop the amount of heat which is necessary to effect complete relieving of stresses in the joint and in the adjacent portions of the shell in which stresses, due to the welding, are likely to exist, the procedure in this connection being governed by the same principles which have heretofore been followed in the operation of stress-relieving furnaces of well known construction which were designed to receive the whole structure on which a welded joint was to be stress relieved. As distinguished from this well known operation, however, the stress relieving operation by means of the apparatus disclosed herein does not contemplate heating the entire structure to a stress relieving temperature but only that part thereof in which stresses, due to welding, are likely to exist. The well known method referred to is often impractical where the structure on which the welded joint occurs is large; the rotary kiln shell mentioned above being an example, and pipe sections for hydraulic power plants, such as the Boulder Dam project now under construction, in which pipe sections of thirty feet diameter are used, being another. Furnaces large enough so that such structures could be placed into them would be too expensive to build and would also be expensive to operate considering that, according to established practice, it is considered necessary to bring the structure slowly up to the comparatively high temperature, usually well above 1000° F., required to effect the relieving of stresses, and to hold it at that temperature for a period of at least one hour per inch of thickness. The apparatus disclosed herein may be built at comparatively low costs to fit the largest structures, and the costs for operating it in the manner of the well known furnaces, that is, so as to effect a slow rise of temperature and to hold the temperature at the specified height for the required length of time, would likewise be comparatively low. The results accomplished, however, would be equivalent to those accomplished with the well known furnaces in that the temperature of the joint and of the adjacent portions of the structure are raised uniformly throughout the length of the joint, until the temperature required for the relieving of stresses has been reached, said temperature being then also uniform longitudinally of the joint and throughout the length of the joint. After said temperature condition has been maintained for the required length of time, the joint and the adjacent portions of the structure, as in the well known furnaces, are allowed to cool slowly in a still atmosphere, the heat insulating casings remaining applied during the cooling period. After the temperature of the joint and the adjacent portions of the shell has sunk below the minimum temperature permitting the relieving of stresses and to a temperature at which it is safe to expose the covered portions of the structure to the open air, the casings may be removed.

It should be noted that the heat insulating linings 15 and 16 restrict the transmission of heat from the heating coils 17 into the lateral compartments of the outer casing, and that the heat insulating linings 35 and 36 likewise restrict the emission of heat from the heating coils 37 into the lateral compartments of the inner casing. The portions of the shell in which stresses, set up during the welding of the joint, may exist lie between the baffles, and these are so spaced, transversely of the joint, that the widths of the central compartments of the casings are ample to accommodate those portions of the shell. In other words, a plane through the heat insulating linings 15 and 35, at the sides thereof facing the heating coils, and a plane through the heat insulating linings 16 and 36, at the sides thereof facing the heating coils, are spaced from each other transversely of the joint, for a distance substantially equal to the width of the portion of the shell, in which stresses are to be relieved. The lateral compartments of the casings 5 and 6 are of substantial widths, transversely of the joint, and there are two zones on the shell, one between the baffles 15 and 35, and the other between the baffles 16 and 36, where the shell portion covered by the central compartments of the casings 5 and 6 merges with the shell portions covered by the lateral compartments of the casings 5 and 6. It is desirable that there be no sudden drop of temperature, transversely of the joint, in these merging zones and in this connection the following should be noted.

The spacing of the free ends of the heat insulating linings 15 and 16 from the outer surface of the shell, and the spacing of the free ends of the heat insulating linings 35 and 36 from the inner surface of the shell have the effect that, when the portion of the shell within the central compartment is brought up to a suitable stress relieving temperature, a certain amount of heat may pass from the central compartment into the lateral compartments, and while the portion of the shell in the central compartment is kept at stress relieving temperatures, the shell portions of the merging zones and the portions of the shell in the lateral compartments will be at temperatures gradually decreasing transversely of the joint. Any other suitable means for obtaining this effect or for making it more or less pronounced, may be used. The object aimed at is to avoid the arising of any harmful conditions in the portions of the shell adjacent to the portion from which stresses are to be relieved. In this connection it should be noted that, while the temperature of the shell portions within the lateral compartments of the casings is of gradually decreasing height transversely of the joint, the temperature distribution in these portions is substantially uniform circumferentially of the shell, that is, longitudinally of the joint, and that such circumferentially uniform and transversely decreasing temperature distribution will exist while the temperature of the shell portions within the central compartments of the casings is substantially uniform circumferentially of the shell as well as transversely of the joint. During cooling, while the casings remain applied to the shell, the emission of heat from the portions of the shell within the casings is restricted, and the cooling of these portions will, therefore, be uniform circumferentially of the shell throughout the length of the joint.

The means for generating heat are here shown in the form of electric heating coils, but different means for heating the joint uniformly throughout its length may be employed. Instead of electric heating by radiation, as shown in the drawing, electric heating by induction (high frequency current) may be used. If it should be desired to heat by combustion the construction of the casings may be modified accordingly in order to provide an adequate supply of oxygen but still prevent a too rapid dissipation of heat during the cooling period.

It should also be noted that the construction of the casings in sections, particularly of the inner casing, offers advantages. For instance, if it is desired to stress relieve circumferential joints in a vessel which is closed at both ends, the sections of the inner casing may be brought into the vessel through a manhole or the like, assembled within the casing, and removed again after disassembly.

A modified construction of the apparatus described hereinbefore, which is suitable for stress relieving longitudinal joints of a cylindrical plate metal structure, is shown in Fig. 4. The apparatus is constructed on the same principles as explained in connection with Figs. 1 to 3. It consists of an outer casing 43 and an inner casing 44, the interior space of each casing being divided by baffles 45 into a central zone, enclosing heating elements 46, and lateral zones intended to cover the portions of the plate metal structure adjacent to the joint, and to cause a gradual decrease of temperature from the heated joint to said adjacent portions. Spacing blocks 47 of heat insulating material are used for purposes of adjustment and for preventing metallic contact between the surface of the cylindrical structure and the side walls of the casings. Fig. 1 shows in dash-dotted lines the application of a furnace according to Fig. 4 to the longitudinal joint of a section of the cylindrical shell 1. It should be understood, however, that the longitudinal joints of a structure like the cylindrical shell 1 are preferably stress relieved before the sections are joined together by circumferential joints.

The furnace shown in Fig. 4 may also be modified for application to a welded joint between straight metal plates, in which case the outer and inner casings 43 and 44 would preferably take the form of square boxes having each one open side facing the plate metal.

It should be understood that it is not intended to limit the invention to the exact details of construction and procedure herein shown and described, for various modifications within the scope of the claims may occur to persons skilled in the art.

It is claimed and desired to secure by Letters Patent:

1. The method of relieving a zone of a metal structure from stresses due to a welded joint in said zone, which includes the step of heating the metal of said zone to a stress relieving temperature which is uniform throughout the length and width of said zone, and the step of applying to portions of said structure, adjacent to said zone, while said adjacent portions are subject to heating by dissipation of heat from said zone, additional heat of such intensity as to create in said adjacent portions wide zones laterally of said first zone, wherein the temperature decreases substantially continuously transversely of said joint and wherein the temperatures are uniform longitudinally of said joint.

2. The method of relieving a zone of a metal structure from stresses due to a welded joint in said zone, which includes the step of heating the metal of said entire zone simultaneously throughout the width and length of said zone to a substantially uniform stress relieving temperature, and the simultaneous step of applying to portions of said structure adjacent to said zone and subject to heating by dissipation of heat from said zone, additional heat simultaneously throughout the lengths of said adjacent portions longitudinally of said joint, said additional heat being of sufficient intensity and graded transversely of said joint so as to create in said adjacent portions wide zones laterally of said first zone, wherein the temperature decreases substantially continuously transversely of said joint and wherein the temperatures are uniform longitudinally of said joint.

3. The method of relieving a zone of a metal structure from stresses due to a welded joint in said zone, which includes the step of heating the metal of said entire zone simultaneously throughout the width and length of said zone to a substantially uniform stress relieving temperature, and the step of applying to portions of said structure adjacent to said zone, while said adjacent portions are subject to heating by dissipation of heat from said zone, additional heat of sufficient intensity and graded transversely of said joint so as to create in said adjacent portions wide zones laterally of said first zone, wherein the temperature decreases substantially continuously transversely of said joint and wherein the temperatures are uniform longitudinally of said joint.

4. The method of relieving a zone of a metal structure from stresses due to a welded joint in said zone, which includes the step of heating the metal of said zone to a stress relieving temperature which is uniform throughout the length and width of said zone, and the step of applying to portions of said structure adjacent to said zone, while said adjacent portions are subject to heating by dissipation of heat from said zone, additional heat simultaneously throughout the lengths of said adjacent portions longitudinally of said joint, said additional heat being of sufficient intensity and graded transversely of said joint so as to create in said adjacent portions wide zones laterally of said first zone, wherein the temperature decreases substantially continuously transversely of said joint and wherein the temperatures are uniform longitudinally of said joint.

5. The method of relieving a zone of a plate metal structure from stresses due to a welded joint in said zone, which includes the step of heating the plate metal of said entire zone simultaneously from opposite sides thereof to a stress relieving temperature which is uniform throughout the length and width of said zone, and the step of applying to portions of said structure adjacent to said zone, while said adjacent portions are subject to heating by dissipation of heat from said zone, additional heat simultaneously from opposite sides of said adjacent portions, said additional heat being of sufficient intensity and graded transversely of said joint so as to create in said adjacent portions wide zones laterally of said first zone, wherein the temperature decreases substantially continuously transversely of said joint and wherein the temperatures are uniform longitudinally of said joint.

6. The method of relieving a zone of a plate metal structure from stresses due to a welded joint in said zone, which comprises heating the plate metal of said zone to a stress relieving temperature which is uniform throughout the length and width of said zone; applying to portions of said structure adjacent to said zone, while said adjacent portions are subject to heating by dissipation of heat from said zone, additional heat of such intensity as to create in said adjacent portions wide zones laterally of said first zone, wherein the temperature decreases substantially continuously transversely of said joint and wherein the temperatures are uniform longitudinally of said joint; maintaining said uniform temperature distribution in said first zone and said longitudinally uniform and transversely decreasing temperature distribution in said lateral zones for a sufficient length of time to effect complete relieving of stresses in said first zone, and lowering the temperatures in said first and lateral zones uniformly throughout the lengths thereof longitudinally of said joint.

RAY C. NEWHOUSE.